(12) United States Patent
Cook et al.

(10) Patent No.: US 6,231,470 B1
(45) Date of Patent: May 15, 2001

(54) TRANSFER CASE FOR USE WITH TRANSAXLE

(75) Inventors: Dennis Cook, Royal Oak, MI (US);
Craig B. Fowler, Maumee, OH (US);
Dan J Showalter, Plymouth, MI (US);
T. Mark Joslin, Howell, MI (US);
Joseph W. Beckerman, Livonia, MI (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/177,742

(22) Filed: Oct. 23, 1998

(51) Int. Cl.$^7$ .................................................. B60K 17/35
(52) U.S. Cl. .................................. 475/206; 180/249
(58) Field of Search .................................. 475/198, 204, 475/205, 206; 180/247, 249

(56) References Cited

U.S. PATENT DOCUMENTS

| | | | |
|---|---|---|---|
| 3,580,350 | * 5/1971 | Arkus-Duntov | 180/248 |
| 4,541,503 | * 9/1985 | Akutagawa et al. | 180/249 |
| 4,577,721 | 3/1986 | Ashikawa | 180/248 |
| 4,589,304 | 5/1986 | Ashikawa et al. | 74/701 |
| 4,606,243 | 8/1986 | Ashikawa et al. | 74/700 |
| 4,618,021 | 10/1986 | Ashikawa et al. | 180/248 |
| 4,688,447 | 8/1987 | Dick | 74/665 |
| 4,700,800 | * 10/1987 | Friedrich et al. | 180/249 |
| 4,714,128 | 12/1987 | Yoshinaka et al. | 180/247 |
| 4,722,413 | 2/1988 | Okubo | 180/247 |
| 4,860,612 | 8/1989 | Dick et al. | 74/665 |
| 5,098,351 | * 3/1992 | Kobayashi | 180/249 X |
| 5,098,352 | 3/1992 | Montanaro et al. | 475/86 |
| 5,109,944 | 5/1992 | Torii | 180/248 |
| 5,193,639 | 3/1993 | Hara et al. | 180/248 |
| 5,197,565 | 3/1993 | Sado | 180/248 |
| 5,209,321 | 5/1993 | Sado | 180/248 |
| 5,353,889 | 10/1994 | Hamada | 180/242 |
| 5,407,024 | 4/1995 | Watson et al. | 180/248 |
| 5,450,921 | * 9/1995 | Kameda et al. | 475/206 X |
| 5,695,022 | 12/1997 | Zalewski et al. | 180/249 |
| 5,704,443 | * 1/1998 | Janiszewski | 180/247 |
| 5,833,566 | * 11/1998 | Showalter | 475/198 |

* cited by examiner

Primary Examiner—Charles A Marmor
Assistant Examiner—Ha Ho
(74) Attorney, Agent, or Firm—Brinks Hofer Gilson & Lione; Greg Dziegielewski

(57) ABSTRACT

A transfer case adapted for installation on a front-wheel drive vehicle having a transversely oriented engine and transaxle receives drive torque on a transferse axis and provides it to the rear differential on a longitudinal axis. The transfer case is driven through the front axle center differential cage. A drive chain delivers power through sprockets to a modulating or viscous clutch disposed behind and parallel to the front stub axles. The output of the clutch is provided to a bevel gear set which drives the rear prop shaft, rear differential and rear axles. The transfer case and rear prop shaft are preferably disposed along the longitudinal center line of the vehicle. Alternatively, the transfer case and the rear prop shaft may be disposed along an axis laterally offset but parallel to the longitudinal center line of the vehicle.

9 Claims, 3 Drawing Sheets

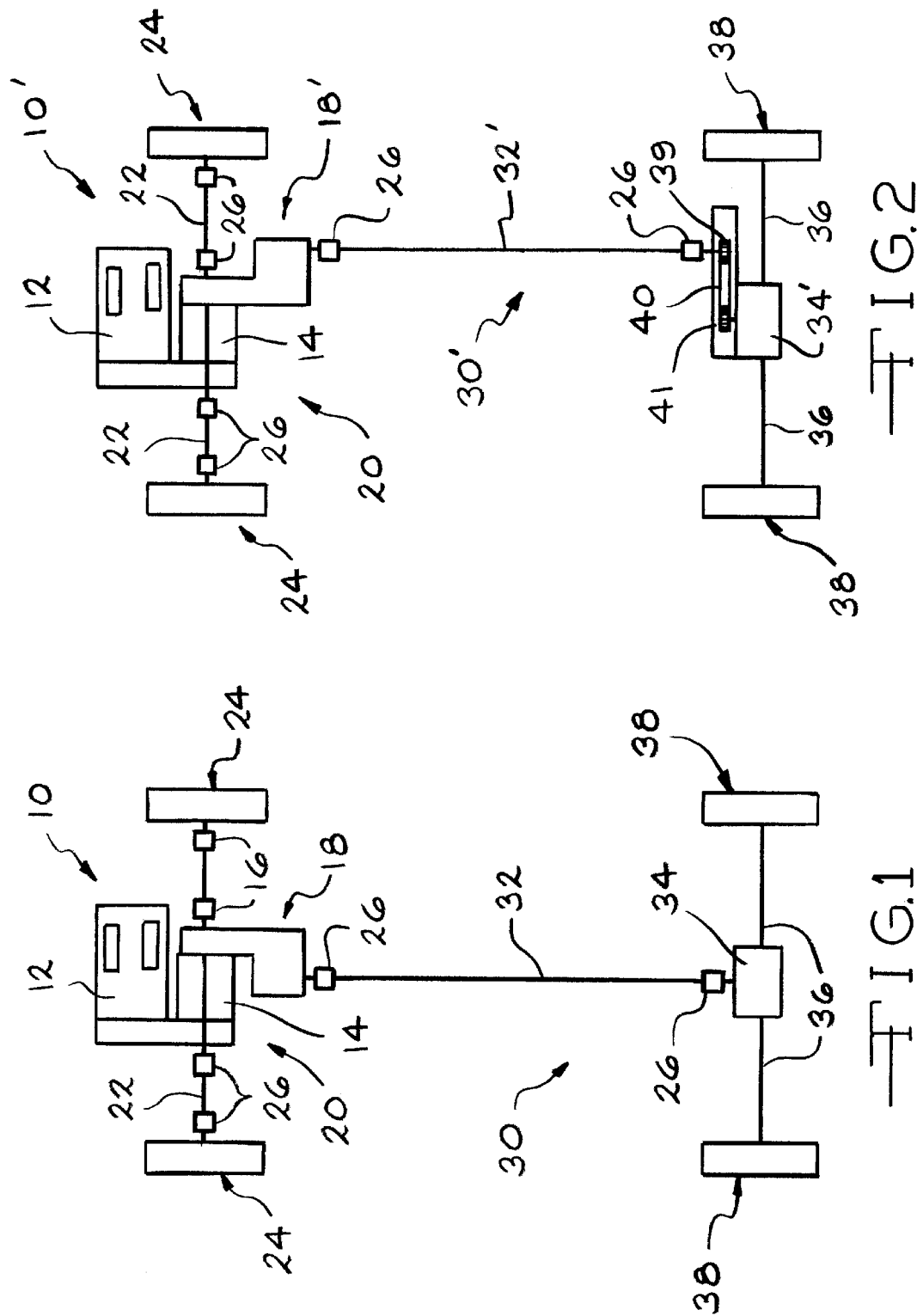

TRANSFER CASE FOR USE WITH TRANSAXLE

BACKGROUND OF THE INVENTION

The invention relates generally to transfer cases for four-wheel drive motor vehicles and more specifically to a transfer case intended for use with a transaxle of a front wheel drive motor vehicle and which includes components for redirecting power from the transverse axis of rotation of the transaxle to a longitudinal axis of rotation.

Conventional four-wheel drive vehicles having a prime mover, transmission and transfer case generally have these components disposed in alignment along the longitudinal center line of the vehicle. This configuration is dictated by two features: the length of many engines measured along its crankshaft and the center tunnel which has become an accepted intrusion into the passenger compartment of most vehicles.

Addition to or adaptation of a two-wheel drive vehicle having a transversely mounted engine and transaxle to a four-wheel drive vehicle presents many configuration and packaging issues beyond those encountered with a longitudinally mounted engine and transmission. One of the most challenging is the location of the rear prop shaft inasmuch as the center tunnel on most front wheel drive vehicles is occupied by the exhaust system. More important are the mechanical considerations such as the location of the power takeoff to the rear drive line and the location and orientation of the transfer case and its clutch or other coupling mechanism which selectively provides drive torque to the two additional (rear) drive wheels.

The present invention is directed to such a device.

SUMMARY OF THE INVENTION

A transfer case adapted for installation on a front-wheel drive vehicle having a transversely oriented engine and transaxle receives drive torque on a transverse axis and provides it to the rear differential on a longitudinal axis. The transfer case is driven through the front axle center differential cage. A drive chain delivers power through sprockets to a modulating or viscous clutch disposed behind and parallel to the front stub axles. The output of the clutch is provided to a bevel gear set which drives the rear prop shaft, rear differential and rear axles. The transfer case and rear prop shaft are preferably disposed along the longitudinal center line of the vehicle. Alternatively, the transfer case and the rear prop shaft may be disposed along an axis laterally offset but parallel to the longitudinal center line of the vehicle.

It is thus an object of the present invention to provide a transfer case and drive line adapted for installation in a front wheel drive vehicle.

It is a further object of the present invention to provide a transfer case and drive line adapted for installation in a front wheel drive vehicle having a transaxle.

It is a still further object of the present invention to provide a transfer case and modulating clutch adapted for on-center installation in a motor vehicle having a front wheel drive power train.

It is a still further object of the present invention to provide a transfer case and viscous clutch adapted for on-center installation in a motor vehicle having a front wheel drive power train.

It is a still further object of the present invention to provide a transfer case and modulating clutch assembly adapted for offset installation in a motor vehicle having a front wheel drive.

It is a still further object of the present invention to provide a transfer case and viscous clutch assembly adapted for offset installation in a motor vehicle having a front wheel drive power train.

Further objects and advantages of the present invention will become apparent by reference to the following description to the preferred embodiment and appended drawings wherein like reference numbers refer to the same component, element or feature.

BRIEF DESCRIPTION OF THE DRAWINGS

FIG. 1 is a schematic plan view of a four-wheel drive motor vehicle having an on center transfer case, FIG. 2 is a schematic plan view of an alternate embodiment four-wheel drive transfer case having an offset transfer case.

DESCRIPTION OF THE PREFERRED AND ALTERNATE EMBODIMENTS

Figure 3:
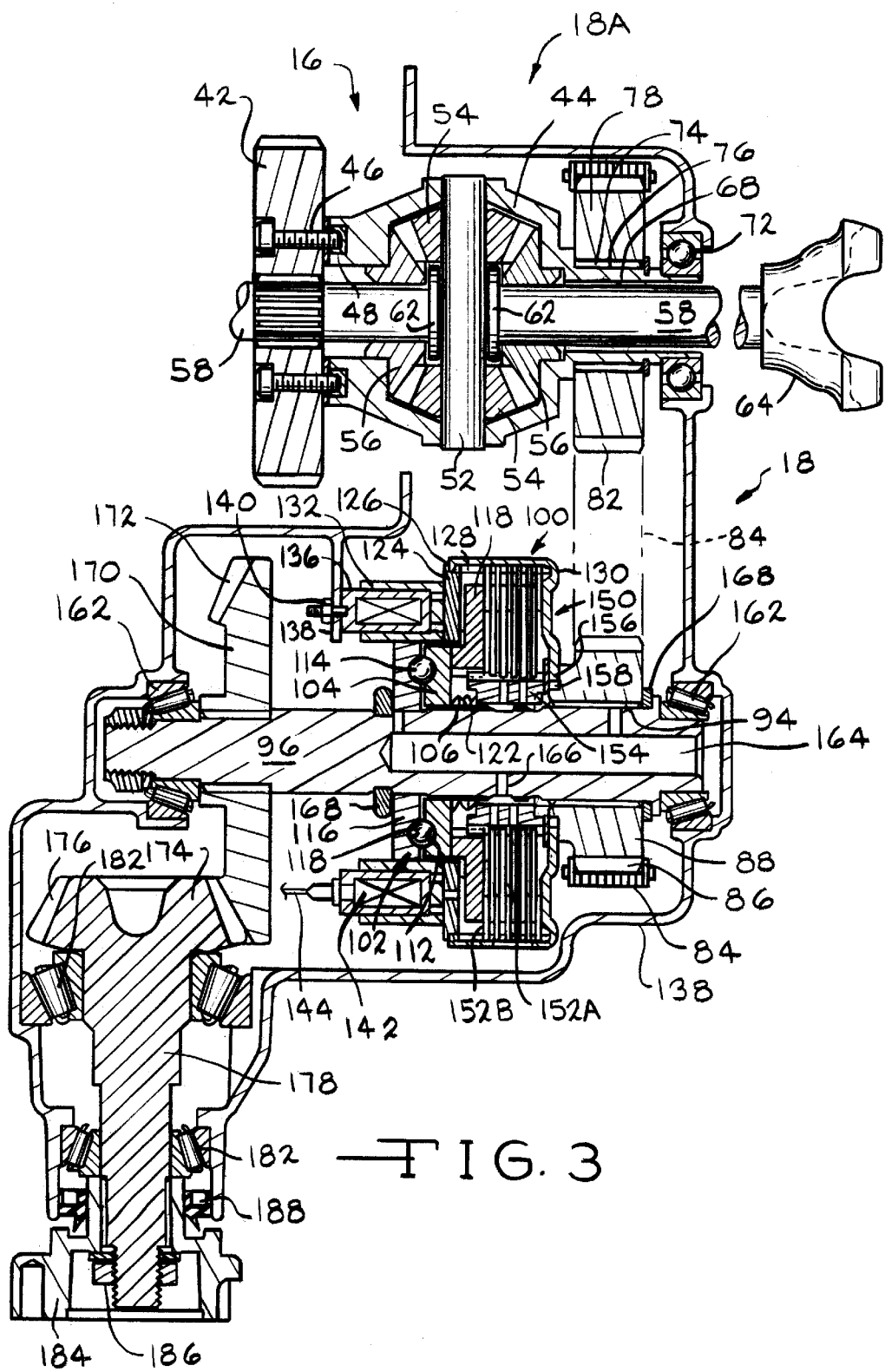
FIG. 3 is a full, sectional view of a motor vehicle transfer case and modulating clutch assembly according to the present invention.

Referring now to FIG. 1, an four-wheel motor vehicle drive assembly according to the present invention is illustrated and generally designated by the reference number 10. The four-wheel motor vehicle drive assembly 10 includes an engine or prime mover which may be either a gasoline or Diesel internal combustion engine 12 which is oriented transversely in the engine compartment of the motor vehicle and is coupled to and drives a transaxle 14 having both a multiple speed automatic or manual transmission and a front axle differential assembly 16 (See FIGS. 3 and 4). An on center transfer case assembly 18 is secured to the transaxle assembly 14. The transaxle assembly 14 and specifically the front differential assembly 16 provides power to a primary or front drive line a assembly 20 having a pair of front axles 22 which are coupled to and directly drive a pair of front or primary tire and wheel assemblies 24. Typically, the front axles 22 will include pairs of universal joints 26 which accommodate static and dynamic misalignments of the axles 22 with the other components of the primary drive line 20.

A secondary drive line 30 extends along the longitudinal center line of the vehicle from the transfer case assembly 18 and includes a secondary drive shaft 32 which is coupled to and drives a rear differential 34 which is in turn coupled to and drives a pair of rear or secondary axles 36. The outer ends of the rear axles 36 are coupled to and drive a pair of rear or secondary tire and wheel assemblies 38. Once again, suitable universal joints 26 may be utilized in the secondary drive line 30 to accommodate static and dynamic misalignments of the drive line components.

Referring now to FIG. 2, an alternate embodiment adaptive four-wheel motor vehicle drive line according to the present invention is illustrated and designated by the reference number 10'. The first alternate embodiment motor vehicle drive line 10' also includes an engine or prime mover which may either be gasoline or Diesel engine 12 which is oriented transversely in the engine compartment of the motor vehicle and is coupled to and drives a transaxle 14 having both a multiple speed automatic or manual transmission and a front axle differential assembly 16 (See FIGS. 3 and 4). An offset transfer case assembly 18' is secured to the transaxle assembly 14. The transaxle assembly 14 and specifically the front differential assembly 16 provide power to a primary or front drive line 20 having a pair of front axles 22 which are coupled to and directly drive a pair of front or primary tire and wheel assemblies 24. Typically, the front axles 22 include pairs of universal joints 26 which accommodate static and dynamic misalignments of the axles 22 with the adjacent components of the primary drive line 20.

A secondary drive line 30' is offset from the longitudinal center line of the vehicle, extends from the transfer case assembly 18' and includes an offset secondary drive shaft 32' which is coupled to and drives a chain drive sprocket 39. The chain drive sprocket 39, in turn, drives a chain 40 and thence a driven chain sprocket 41 which is coupled to and drives a rear differential 34'. In turn, the rear differential 34' is coupled to and drives a pair of rear or secondary axles 36. The outer ends of the rear axles 36 are coupled to and drive a pair of rear or secondary tire and wheel assemblies 38. Here as well, suitable universal joints 26 may be utilized in the secondary drive line 30' to accommodate static and dynamic misalignments of the drive line components.

In the following text, two distinct clutch configurations (modulating and viscous) are illustrated only in the on-center transfer case assembly 18 illustrated in FIG. 1. It should be appreciated, however, that either clutch configuration may be utilized in either the on center transfer case assembly 18 illustrated in FIG. 1 or the offset transfer case assembly 18' illustrated in FIG. 2. This is readily apparent by inspection of the significant similarities between the transfer case assemblies 18A and 18B illustrated in FIGS. 3 and 4, respectively, and the minor differences between the drive assemblies 10 and 10' illustrated in FIGS. 1 and 2, respectively. Aside from the obvious addition of the rear chain drive assembly in the secondary drive line 30' of the drive assembly 10', the other modification involves rotating the transfer case assembly 18 or 18' 180° about its longitudinal axis and providing mounting features on its opposite face in order to secure it to the adjacent transaxle 14. All of the mechanical components and inter-relationships of the transfer cases 18 and 18' are the same. Accordingly, those components and relationship will be described only with reference to the on center transfer case 18, it being understood that differences between the transfer case assembly 18 and the transfer case assembly 18' relate only to mounting or attachment aspects of the assemblies which form no portion of the present invention.

Referring now to FIG. 3, an on center transfer case assembly 18 which is designated 18A receives drive torque from an input member 42 of the transmission of the transaxle 14. The input member 42 is coupled to a drive cage 44 of the front differential assembly 16 by any suitable coupling such as a plurality of bolts 46 extending into complementarily threaded bores 48. Alternatively, pins, lugs or projections extending from the input member 42 to the drive cage 44 or face gear teeth, axially engaging splines or gear teeth (all not illustrated) may be utilized to rotationally couple the input member 42 to the drive cage 44. The drive cage 44 receives and supports a conventional differential (epicyclic) gear train and includes a fixed transverse stub shaft 52 which receives a pair of opposed bevel gears 54. In conventional fashion, both of the opposed bevel gears 54 engage and drive an opposed pair of side bevel gears 56 which are secured to and drive a pair of output shafts 58. Each of the output shafts 58 includes an enlarged head 62 which renders the output shafts 58 captive within the drive cage 44. The output shafts 58 are each terminated by a flange 64 which forms a portion of a respective one of a pair of universal joints 26 illustrated in FIG. 1.

The drive cage 44 includes an extension or sleeve portion 68 which extends about one of the output shafts 58 and is partially received within an anti-friction bearing such a ball bearing assembly 72. An exterior cylindrical surface of the sleeve portion 68 includes a plurality of splines or gear teeth 74 which are engaged by and drive a complementarily configured plurality of female splines or gear teeth 76 formed in a chain drive sprocket 78. The chain drive sprocket 78 includes chain drive teeth 82 which engage and drive a drive chain 84.

The drive chain 84 is disposed about, engages and drives chain teeth 86 on a driven chain sprocket 88. The driven chain sprocket 88 includes an internal journal or anti-friction (needle) bearing 94 which freely rotatably disposes the driven chain sprocket 88 on an intermediate or stub shaft 96.

The on center transfer case assembly 18A also includes an electromagnetic, modulateable disc pack clutch assembly 100. The disc pack clutch assembly 100 is disposed about the stub shaft 96 and includes an operator or actuator assembly 102 having a circular drive member 104 rotationally coupled to the stub shaft 96 through an interengaging set of splines or gear teeth 106. One face of the circular drive member 104 includes a plurality of circumferentially spaced apart recesses 112 in the shape of an oblique section of a helical torus. Each of the plurality of recesses receives one of a like plurality of load transferring balls 114.

A circular driven member 116 disposed adjacent the circular drive member 104 includes a like plurality of recesses 118 on an opposing face which define the same shape as the recesses 112 in the circular drive member 104. The oblique sidewalls of the recesses 112 and 118 function as ramps or cams and cooperate with the balls 114 to drive the circular members 104 and 116 axially apart in response to relative rotation therebetween. It will be appreciated that the recesses and the load transferring balls 114 may be replaced with other analogous mechanical elements which cause axial displacement of the circular members 104 and 116 in response to relative rotation therebetween. For example, tapered rollers disposed in complementarily configured conical helices may be utilized.

The circular drive member 104 is secured to or integrally formed with a radially outwardly extending apply plate 118. A compression spring 122 is concentrically disposed about the stub shaft 96. The compression spring 122 may take the form of one or a plurality of Belleville springs or wave washers. The compression spring 122 provides a biasing or restoring force to the circular drive member 104 and the apply plate 118 urging them to the left as illustrated in FIG. 3. Behind, i.e., to the left of, the apply plate 118 and generally aligned therewith is a clutch armature 124. The clutch armature 124 includes a plurality of male splines or gear teeth 126 disposed about its periphery which engage a complementary plurality of female splines or gear teeth 128 which extend axially along the inner surface of a cylindrical portion of a bell shaped clutch housing 130.

Positioned adjacent the face of the clutch armature 124 opposite the apply plate 118 is a soft iron rotor 132. The rotor 132 is an annulus having a generally U-shaped cross-section and is freely rotatably received about a complementarily configured stationary coil housing 136. The rotor 132 is coupled to and rotates with the circular driven member 116 by virtue of a splined interconnection or other securement such as a friction fit or welds. The coil housing 136 is secured to a web of the housing 138 of the transfer case assembly 18A by a plurality of suitable fasteners 140, one of which is illustrated in FIG. 3. The coil housing 136 receives an electromagnetic coil 142 which is connected to a source of electrical energy through an electrical conductor 144.

Adjacent the apply plate 118 and contained within the clutch housing 130 is a disc pack assembly 150. The disc pack assembly 150 includes a plurality of interleaved friction clutch plates or discs 152. A first plurality of smaller diameter clutch discs 152A are received upon the male splines of a splined collar 154 which in turn seats upon male splines of the stub shaft 96. The first plurality of clutch discs 152A and the splined collar 154 thus all rotate with the stub shaft 96. A second plurality of larger diameter clutch discs 152B are interleaved with the first plurality of discs 152A and include splines about their peripheries which engage the splines or gear teeth 128 on the inner surface of the cylindrical portion of the clutch housing 130 and rotate therewith. The clutch housing 130 is concentrically disposed about the stub shaft 96 and includes a plurality of female splines or gear teeth 156 which are received upon complementarily configured male splines or gear teeth 158 in the driven chain sprocket 88. The driven chain sprocket 88, is, as noted, freely rotatably disposed about the stub shaft 96. The driven chain sprocket 88 thus receives torque and delivers it to the clutch housing 130 and thence to the second plurality of clutch discs 152B which rotate with the clutch housing 130.

It will be appreciated that energization of the electromagnetic coil 142 creates a magnetic flux which produces drag and thence relative rotation between the circular drive member 104 and the circular driven member 116 thereby driving them apart. As the circular members 104 and 116 separate, a compressive force is applied through the apply plate 118 to the disc pack assembly 150. Compression of the friction discs 152A and 152B results in torque transfer from the driven chain sprocket 88 to the stub shaft 96. The magnitude of the torque transferred from the driven chain sprocket 88 to the stub shaft 96 from no torque transfer to 50 percent torque transfer, that is, a nominally equal split of torque between the two drive line assemblies 20 and 30, can be controlled by adjusting the magnitude of electrical energy provided to the electromagnetic coil 142. Further details of the structure and operation of the disc pack assembly 100 may be found in co-owned U.S. Pat. No. 5,407,024 granted Apr. 18, 1995 which is hereby incorporated by reference.

The stub shaft 96 is supported at its opposite ends by suitable anti-friction bearings such as tapered roller bearing assemblies 162. The stub shaft 96 includes an axial passageway 164 which facilitates the flow of lubrication into the clutch pack assembly 100 through radial passageways 166. The disc pack clutch assembly 100 is axially positioned upon the stub shaft 96 by a pair of snap rings 168. Also secured by splines, a friction fit or welding to the stub shaft 96 is a bevel gear 170 having bevel gear teeth 172. The bevel gear 170 is in constant mesh with a bevel pinion gear 174 having bevel gear teeth 176. The bevel gear 174 includes a stub shaft 178 which is supported at its end adjacent the bevel gear 174 and its opposite end by a pair of anti-friction bearings such as tapered roller bearing assemblies 182. The end of the stub shaft 176 is secured to a flange 184 which may form a portion of a universal joint 26. The flange 184 is secured to the stub shaft 178 by a threaded fastener such as a nut 186. Suitable oil seals 188 seal off the interior of the housing 138 of the transfer case assembly 18A and retain lubricating and cooling fluid therein.

Figure 4:
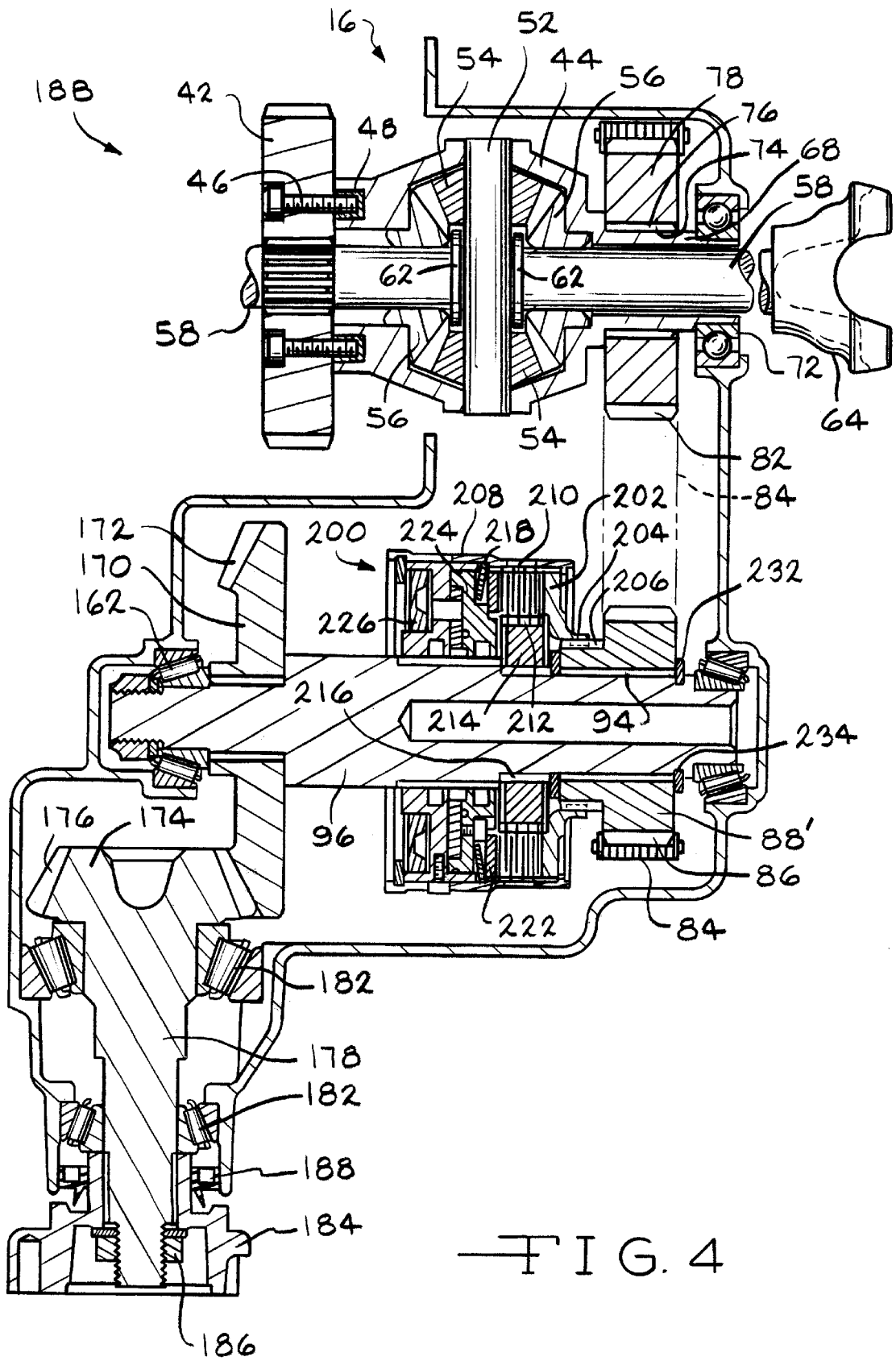
FIG. 4 is a full, sectional view of a motor vehicle transfer case and viscous clutch assembly according to an alternate embodiment of the present invention.

Referring now to FIG. 4, an alternate embodiment on center transfer case assembly 18 which is designated 18B receives drive torque from an input member 42 of the transmission of the transaxle 14. The input member 42 is coupled to a drive cage 44 of the front differential assembly 16 by any suitable coupling such as a plurality of bolts 46 extending into complementarily threaded bores 48. Alternatively, pins, lugs or projections extending from the input member 42 to the drive cage 44 or face gear teeth or axially engaging splines or gear teeth (all not illustrated) may be utilized to rotationally couple the input member 42 to the drive cage 44. The drive cage 44 receives and supports a conventional differential gear train and includes a fixed transverse stub shaft 52 which receives a pair of opposed bevel gears 54. In conventional fashion, both of the opposed bevel gears 54 engage and drive an opposed pair of side bevel gears 56 which are secured to and drive a pair of output shafts 58. Each of the output shafts 58 includes an enlarged head 62 which renders the output shafts 58 captive within the drive cage 44. The output shafts 58 are each terminated by a flange 64 which forms a portion of a respective one of a pair of universal joints 26.

The drive cage 44 includes a sleeve portion 68 which extends about one of the output shafts 58 and is partially received within an anti-friction bearing such a ball bearing assembly 72. The exterior cylindrical surface of the sleeve portion 68 includes a plurality of splines or gear teeth 74 which are engaged by and drive a complementarily configured plurality of female splines or gear teeth 76 formed in a chain drive sprocket 78. The chain drive sprocket 78 includes chain drive teeth 82 which engage and drive a drive chain 84.

The drive chain 84 is disposed about, engages and drives chain teeth 86 on a driven chain sprocket 88'. The driven chain sprocket 88' includes an internal journal or anti-friction (needle) bearing 94 which freely rotatably disposes the driven chain sprocket 88' on an intermediate or stub shaft 96.

The alternate embodiment on center transfer case assembly 18B also includes a viscous clutch assembly 200. The viscous clutch assembly 200 is disposed about the stub shaft 96 and include an input or drive plate 202 which include female splines or gear teeth 204 which engage a complementarily configured spline set 206 on the driven chain sprocket 88'. The drive plate 202 is coupled by splines or other suitable rotational coupling to an outer housing 208. Also coupled by a suitable rotational interconnection such as interengaging splines to the outer housing 208 are a plurality of spaced apart outer clutch plates or discs 210. The outer clutch discs 210 are interleaved with a plurality of inner clutch plates or discs 212 which are splined to an intermediate collar 214. The intermediate collar 214 is rotationally coupled to the stub shaft 96 by a complementarily configured set of gear teeth or splines 216. The regions between the outer clutch plates 210 and 212 are filled with a suitable viscous fluid which provides appropriate rotational coupling and torque delivery from the driven chain sprocket 88 to the stub shaft 96. A Belleville spring or wave washer 220 may be positioned between an apply plate 222 and a stop 224 to apply a preload and thus a preselected minimum coupling between the driven chain sprocket 88 and the stub shaft 96. Preferably, the viscous clutch assembly 200 is a closed unit and the outer housing 208 as well as associated components such as an annulus 226 assembles and seals the clutch 200. It will be appreciated that selection of the appropriate viscous fluid and spring rate of the Belleville spring or wave washer 220 allows adjustment and control of the degree of torque coupling through the viscous clutch assembly 200 as those familiar with such devices will readily appreciate.

The stub shaft 96 is supported at its opposite ends by suitable anti-friction bearings such as tapered roller bearing assemblies 162. The viscous clutch assembly 200 as well as the driven chain sprocket 88 is axially positioned and retained upon the stub shaft 96 by a snap ring 232 which is received within a complementarily sized groove 234 in the stub shaft 96. Also rotationally secured by splines, a friction fit or welding to the stub shaft 96 is a bevel gear 170 having bevel gear teeth 172. The bevel gear 170 is in constant mesh with a bevel pinion gear 174 having bevel gear teeth 176. The bevel pinion gear 174 includes a stub shaft 178 which is supported at its end adjacent the gear 174 and its opposite end by a pair of anti-friction bearings such as tapered roller bearing assemblies 182. The end of the stub shaft 178 is secured to a flange 184 which may form a portion of a universal joint 26. The flange 184 is secured to the stub shaft 178 by a threaded fastener such as a nut 186. Suitable oil seals 188 seal off the interior of the transfer case assembly 18B.

As noted above, it will be appreciated that-either the preferred embodiment motor vehicle drive assembly 10 having the on center transfer case 18 and on center secondary drive shaft 32 or the alternate embodiment motor vehicle drive assembly 10' having an offset transfer case assembly 18' and offset secondary drive shaft 32' are intended to be and are equally useable with either the modulating disc pack clutch assembly 100 illustrated in the transfer case assembly 18A of FIG. 3 or the viscous clutch pack assembly 200 illustrated in the alternate embodiment transfer case assembly 18B of FIG. 4.

The foregoing disclosure is the best mode devised by the inventors for practicing this invention. It is apparent, however, that apparatus incorporating modifications and variations will be obvious to one skilled in the art of motor vehicle transfer cases. Inasmuch as the foregoing disclosure presents the best mode contemplated by the inventors for carrying out the invention and is intended to enable any person skilled in the pertinent art to practice this invention, it should not be construed to be limited thereby but should be construed to include such aforementioned obvious variations and be limited only by the spirit and scope of the following claims.

We claim:

1. A transfer case adapted for use with a motor vehicle transaxle comprising, in combination, a housing, an input member rotating on a first axis, a differential having a pair of opposed, spaced apart ends and opposed output shafts disposed on said first axis, said input member coupled to one of said pair of opposed ends, a chain drive sprocket coupled to another of said pair of opposed ends, a driven chain sprocket, a chain engaging said drive and driven sprockets, a bevel gear set having an input gear rotating on a second axis parallel to said first axis and an output gear rotating on an axis perpendicular to said second axis, and a multiplate friction clutch disposed on said second axis between said driven chain sprocket and said bevel output gear, said clutch including a ball ramp operator having members defining opposed ramped recesses, rolling members disposed in said ramped recesses and an electromagnetic coil.

2. The transfer case of claim 1 wherein said clutch is a modulating clutch.

3. The transfer case of claim 1 further including a prop shaft operably coupled to said output gear of said bevel gear set, said prop shaft disposed substantially along a longitudinal vehicle center line.

4. The transfer case of claim 1 further including a prop shaft operably coupled to said output gear of said bevel gear set, said prop shaft disposed parallel to and laterally offset from a longitudinal vehicle center line.

5. A transfer case adapted for use with a motor vehicle transaxle comprising, in combination, a housing, an input member rotating on an axis, said input member defining a differential gear cage having a pair of opposed, spaced apart ends and enclosing a differential gear train having a pair of opposed coaxial outputs, an input gear coupled to one of said opposed ends of said input member, a chain drive sprocket coupled to another of said opposed ends of said input member, a driven chain sprocket, a chain engaging said drive and driven sprockets, a bevel gear set having an input gear rotating on an axis parallel to said axis of said input member, and an output gear rotating on an axis perpendicular to said axis of said input member, and a clutch operably disposed between said driven chain sprocket and said bevel output gear, said clutch including a first plurality of discs operably coupled to said driven chain sprocket, a second plurality of discs interleaved with said first plurality of discs and operably coupled to said input gear of said bevel gear set, a ball ramp operator having opposed members defining ramped recesses, rolling members disposed in said ramped recesses and an electromagnetic coil cooperating with said ball ramp operator.

6. The transfer case of claim 5 wherein said clutch is a modulating clutch.

7. The transfer case of claim 5 further including a prop shaft operably coupled to said output gear of said bevel gear set, said prop shaft disposed substantially along a longitudinal vehicle center line.

8. The transfer case of claim 5 further including a prop shaft operably coupled to said output gear of said bevel gear set, said prop shaft disposed parallel to and laterally offset from a longitudinal vehicle center line.

9. The transfer case of claim 5 wherein said housing is disposed adjacent a vehicle transaxle.

* * * * *